United States Patent [19]

Frost

[11] Patent Number: 4,899,189

[45] Date of Patent: Feb. 6, 1990

[54] SUPPORT AND PROTECTIVE BASE DEVICE FOR CAMERA

[76] Inventor: George E. Frost, 6535 S. Race Cir. E., Littleton, Colo. 80121

[21] Appl. No.: 265,417

[22] Filed: Oct. 31, 1988

[51] Int. Cl.[4] ............................................. G03B 17/00
[52] U.S. Cl. ................................... 354/293; 248/187; 248/188.5
[58] Field of Search .................. 354/81, 82, 293, 294; 352/243; 248/187, 188.5, 649

[56] References Cited

U.S. PATENT DOCUMENTS

| 2,586,954 | 2/1972 | Juliano | 354/81 |
| 3,704,848 | 12/1972 | Trebes | 248/187 X |
| 3,836,118 | 9/1974 | Meyer | 254/104 |
| 4,027,318 | 5/1977 | Knapp | 354/293 |
| 4,135,335 | 1/1979 | Jensen | 254/104 X |
| 4,281,739 | 8/1981 | Keiser | 248/188.2 X |
| 4,545,660 | 10/1985 | Rudolf | 354/82 |

OTHER PUBLICATIONS

558GITZOPOP Multipod, Karl Heitz (Sales) Woodside, N.Y. 11377, 1988.
BAGPOP Porter'S Camera Catalog, A41, 1988, p. 44, Cedar Fall, Iowa.
Pillow POD Porter'S Camera Catalog, A41, 1988, p. 8, Cedar Falls, Iowa.
Kuban Hitch II, Porter's Catalog, A42, 1988, p. 46, Cedar Falls, Iowa.
Snugger Camera Strap, Porter's Catalog, A42, 1988, p. 46.
Yukon Harness, Porter's Catalog, A42, 1988, p. 46, Cedar Falls, Iowa.
X Press Action Strap, Porter's Catalog, A42, 1988, p. 14, Cedar Falls, Iowa.
EWA Rain Cover, Porter's Catalog, A42, 1988, p. 25, Cedar Falls, Iowa.
EWA Hurricane Hood, Porter's Catalog, A42, 1988, p. 25, Cedar Falls, Iowa.
EWA-Master-Marine, Porter's Catalog, A42, 1988, p. 25, Cedar Rapids, Iowa.
Rain Protector Jumbo Protector, Porter's Catalog, A42, 1989, p. 25, Cedar Rapids, Iowa.

*Primary Examiner*—L. T. Hix
*Assistant Examiner*—Brian W. Brown

[57] ABSTRACT

The lightweight versatile base device stabilizes a camera accommodating a variety of lens assemblies and in a range of transporting, or hand held, or freestanding configurations. The device attaches to the base of a camera and provides eyes to accept accessory support straps in configurations that cooperate with the features of the base device to protect the camera via stabilization. Protection is also improved by the features that accommodate a quick grip and quick release of a flexible protective cover in the above configurations and while allowing the camera to retain preselected control settings for aim and shoot or for time exposure photo objectives. The base device may remain attached to the camera and does not require the operation of screws, knobs, velcro or levers for the above changes of configurations. It provides attitude and elevation adjustment of the camera via optional control wedge members or telescoping leg subassemblies. The device provides an offset interface to accept tripod head mounting and thus compensate for longer lens assemblies.

20 Claims, 2 Drawing Sheets

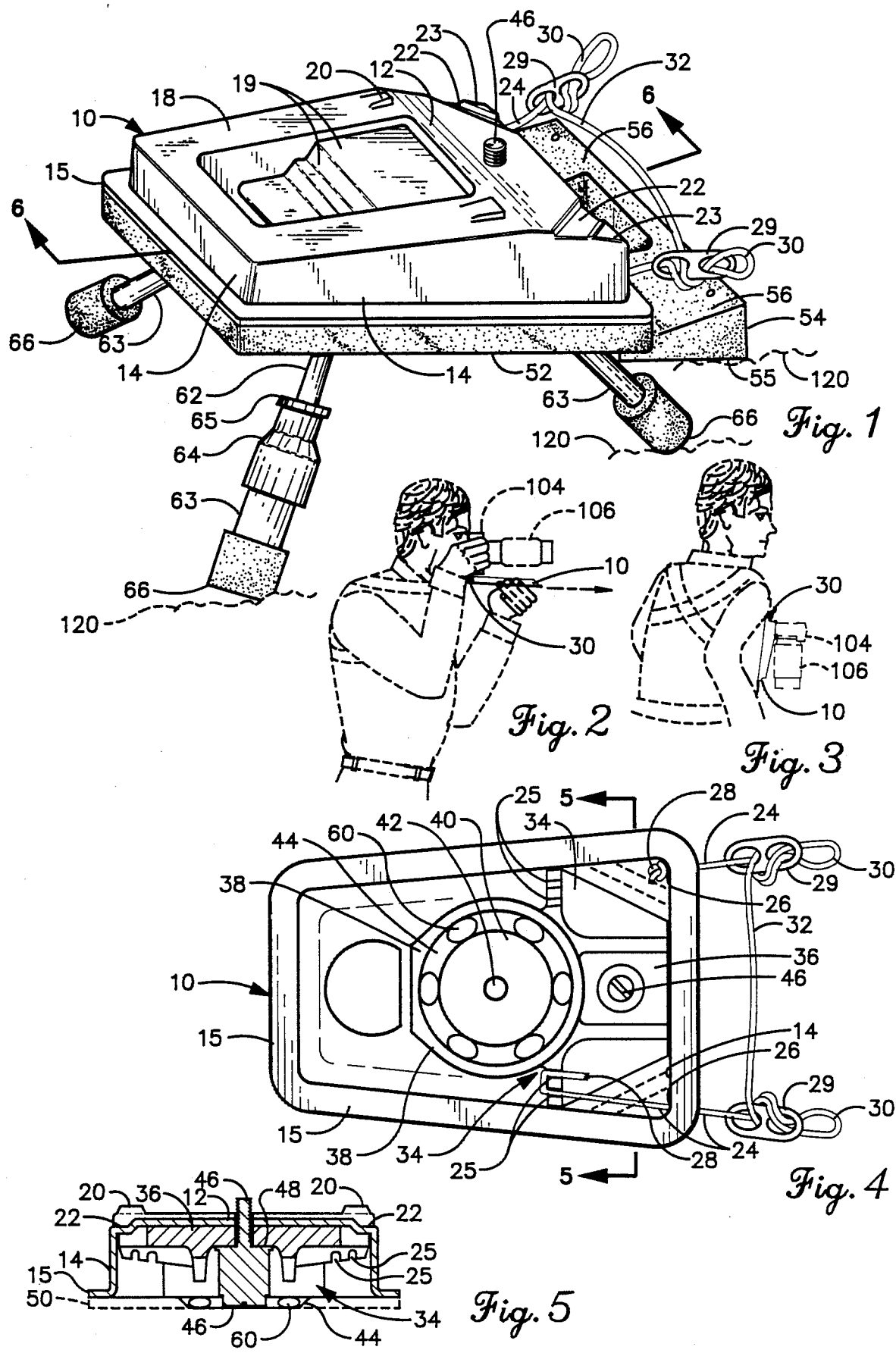

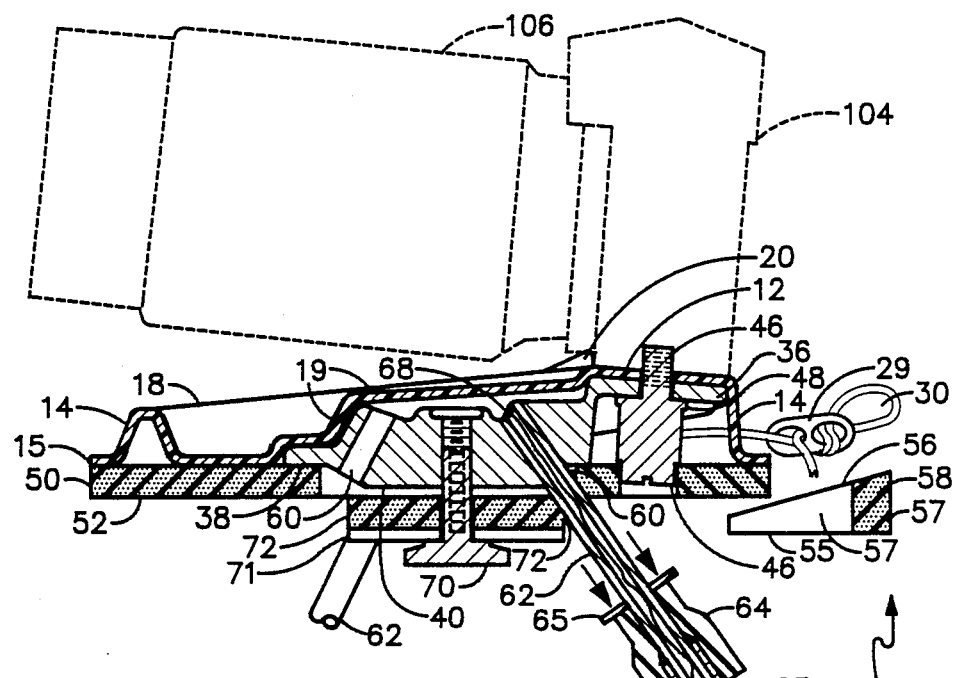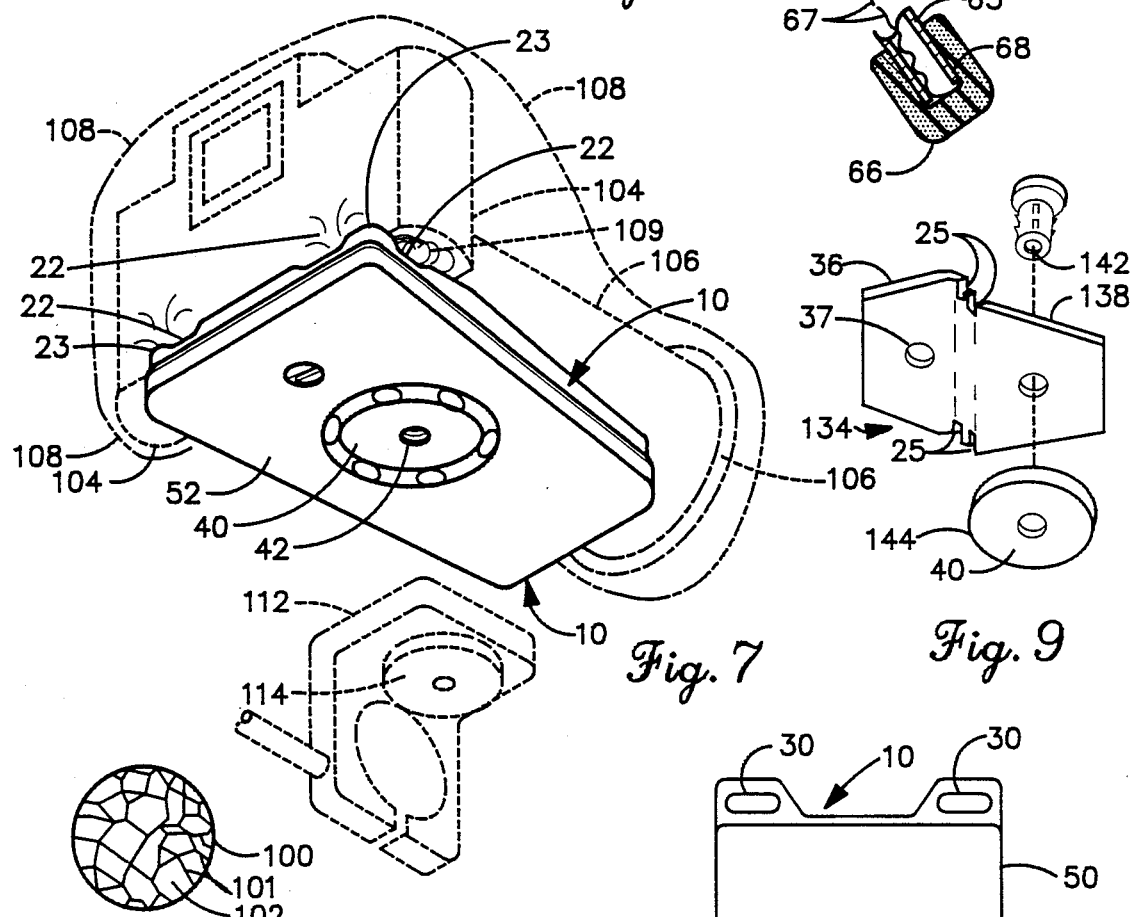

SUPPORT AND PROTECTIVE BASE DEVICE FOR CAMERA

BACKGROUND

1. Field of the Invention

The lightweight versatile base device stabilizes the camera accommodating a variety of lens assemblies and in a range of transporting, hand held and freestanding configurations. The device attaches to the base of a camera and enables grip and quick release of an accessory overall protective cover while allowing the camera to remain with selected ready to shoot control settings for time exposure, close-up or telephoto objectives. The base device in combination with accessory support straps enhances camera protection and stabilization in hanging lens down and in aim and shoot configurations. Unique features of the base member combined with its optional structure members (wedge or leg members) enable elevation and attitude adjustment. Core features also enhance stabilization when interfacing with a tripod head and screw, thus accommodating a camera with longer lens options.

2. Prior Art

Heretofore patents such as 4,545,660, 4,027,318, and 3,704,848 have attempted to solve the problems of stabilizing a camera when used with various acessories such as zoom lens, lens extenders, telephoto lens and close-up lens. All of the above devices, when used outside of studio conditions, have very limited capability of helping the photographer establish camera stability when encountering the wide range of environments, such as sloping surfaces that vary from slippery to very lumpy, and adverse weather.

Pellet bags, bag pods, and pillow pods are light weight, however they provide very limited changes in camera elevation and very limited range of line of sight deviation from the normal.

Blocking up wedges and work holding inclined planes such as patent #4,281,739 #4,135,335 and #3,836,118 were made of heavy or a hard material, or involve elements that limit the on-site selective choice of adjustments in angular relationships between interfacing surfaces.

Molded resilient parts such as wedges and rubber tips have been used in prior art. However, the molded resilient material provided slip resistance on only modest angles of inclination.

Rain covers and storm hoods have been made for hand held cameras. However there has been a long-standing unsolved need for a device that would enable protection of a camera when supported hands free in lens down attitude and when in horizontal line of sight attitude.

OBJECTS AND ADVANTAGES

Accordingly I claim the following objects and advantages of the invention:

A lightweight versatile support and protective base device for enhancing protection, transportation and use of a camera accommodating lens options;

a device to extend the base support to under the lens area for stabilization of a camera and for improved tracking of a photo objective;

a device for gripping and quick release of a dust or rain overall protective cover for long lens and camera body when camera is hanging lens down from an accessory strap and when supported on a tripod like device;

a device for quick removable cover option to enable carrying camera and lens assembled and preadjusted to 'aim and shoot' settings;

a device to enable freestanding slip resistance on sloping surfaces;

a base device to provide freestanding camera body attitude when interchanging lens assemblies;

a base device with one or more complementing wedge body members to enable adjustment and stabilization of the camera line of sight attitude without necessitating the operation of screws, knobs, clamps or levers;

a base device with the option of combining with complementing adjustable legs as structure members that do not necessitate the operation of screws, knobs, or levers when in the process of adjusting camera elevation, attitude and stable repose for a camera accommodating a wide range of lens assemblies;

a base device wherein detachment from the camera body is not required during the above described variety of modes of transportation and use;

DRAWING FIGURES:

FIG. 1 shows perspective of camera base device with depressed trough for cover grip and options for attitude control.

FIG. 2 shows stabilized aim and shoot configuration with hand support to camera base device adding thrust for stabilization.

FIG. 3 shows camera stabilized on support eyes in hands free lens down configuration.

FIG. 4 bottom view of shell and core area showing cord anchor and optional leg sockets, (For clarity of shell and core, the base pad is not shown.)

FIG. 5 shows rear sectional view taken along line 5—5 of FIG. 4, (For clarity of core, base pad and cored are not shown.)

FIG. 6 shows rear sectional view taken along line 5—5 of FIG. 4 (for clarity of core, base pad and cord are not shown)

FIG. 6 shows side sectional view taken along line 6—6 of FIG. 1.

FIG. 7 shows underside perspective of base device accepting quick release overall dust cover, and also shows firm offset base interface to accept tripod head platform.

FIG. 8 shows magnification of base pad and wedge surface texture with a multitude of portions of cell walls.

FIG. 9 shows core member optional embodiment.

FIG. 10 optional embodiment of eyes integral with base device shown in partial view.

LIST OF NUMERICAL REFERENCES:

10 base device
11 base shell
12 camera platform
14 shell wall
15 base rim
18 forward rib
19 under lens trough
20 protrusion body stop
22 cover grip trough
23 rear corners of camera platform
24 support member
25 cord notch (optional)

26 cordhole
28 cord end retainer
29 eye retainer
30 eye
32 hand loop
34 core
36 core camera shelf
37 hole for screw interface to camera
38 core rim
40 bae interface (for tripod)
42 threaded socket
44 turret
45 leg socket
46 camera interface screw
48 screw shoulder (to core)
49 rim shoulder
50 base pad
52 base surface
54 control wedge
55 base surface
56 inclined surface
57 wedge body wall
58 tie member (optional feature)
60 leg receiver socket (optional feature)
61 telescoping leg subassembly (optional structure member)
62 inner leg member
63 outer leg tube
64 resilient tubular coupling
65 press washer
66 leg tip grip
67 flexible strand (optional)
68 end bond of strand (optional)
70 thumbscrew (optional feature)
71 shoulder (optional feature)
72 resilient pad (optional feature)
100 cellular elastomeric material
101 portions of cell walls
102 cavities formed by cell walls
104 camera
106 lens assembly
108 pull cover
109 corner of pull cover twisted and pulled into grip trough
112 accessory tripod head
114 tripod head interface screw
120 underlying interface material
134 core (optional embodiment)
138 core element
144 turret
142 insert threaded socket

DESCRIPTION—SUPPORT AND PROTECTIVE BASE DEVICE FOR CAMERA

FIG. 1 shows a preferred embodiment of a support and protective device 10 with camera interface screw 46 to secure to camera platform 12 a camera accommodating a wide range of lens assemblies (camera and lens not shown for clarity of outer features of the devices). A core member 34, an optional feature, is substantially enclosed by the base shell 11 and the base pad 50 and may be an integral part of the shell 11 or a separate structure member. A support member 24 with eyes 30, 30 and hand loop 32 are adjustable via the eye retainers 29, 29 and the cord ends 28, 28 are retained within the base shell 11. The cord ends 28, 28 are shown as cord enlargements to a size larger than cord holes 26, 26 in the shell walls as one choice of anchor. FIG. 4 and FIG. 5 illustrate optional cord notches 25, 25 in core member 34 as an optional means to secure the cord ends 28, 28. The special feature of the eyes located close to the rear base of the camera contribute substantially to stabilization of the camera when the ends of accessory shoulder straps engage these eyes as described herein regarding FIG. 2, an aim and shoot configuration, and regarding FIG. 3, a hands free, lens down, carry configuration.

Protection from dust or rain is easily provided by a flexible overall pull cover 108 slipped over the lens assembly 106 and camera 104 and retained by the cover corners twisted and pulled into the pull cover grip troughs 22, 22. that are illustrated in FIG. 1 and in FIG. 7. The rear corners 23, 23 of the camera platform 12 underlying the camera body 104 assist in retaining the twisted corners of the flexible pull cover 108. FIG. 1 also shows an under the lens trough 19 that provides clearance below the envelope of a lens assembly to contribute to the ease of pulling on and of quick removal of the pull cover 108. The forward ribs 18, 18 (situated at each side of the under the lens trough) combine with the shell walls 14, 14 and the base rim 15 to form a lightweight structure to stabilize a camera accommodating a wide variety of lens assemblies. The bae pad 50 attached by bond material to the base rim 15 provides a slip resistant base surface texture for stability on sloping surfaces. Furthermore the configuration of the shell walls 14, 14, forward ribs 18, 18 and under lens trough 19, combine to provide a freestanding structure for stabilization of a camera and for access for interchanging lens assemblies. Protrusion body stops 20, 20 at the forward edge of the camera platform 12 restrain the camera body from turning on its interface screw 46, a much needed feature when manipulating the camera with heavy lens assemblies.

Attitude adjustment of the camera line of sight of a camera mounted upon the base device is provided by a choice of options including detachable telescoping legs shown in FIG. 1 and described under sectional view FIG. 6. FIG. 1 also shows the attitude control wedge 54 as an ultra lightweight option for freestanding attitude control. The inventor's preferred embodiment of the control device 54 is a wedge body member as illustrated in twin wedge form, wherein the base surface 55 and inclined surface 56 are of the varied surface texture similar to that illustrated in FIG. 8. FIG. 8 illustrates a magnification of a typical sample of a multitude of portions of cell walls 101 and cavities 102 in random orientation as exposed by cutting action thru resilient elastomeric material 100. The random orientation of the exposed portions of a multitude of cell walls enables elements of the network of cell walls to flex and reposition in random patterns with respect to a local contact point or local contact area of an interfacing surface. The exposed edges of resilient cell walls is the outstanding surface structure and texture whereby the base pad 50 and attitude control wedge 54 respectively flex, grip and remain in stable repose with respect to smooth or sloping or irregular interfacing surfaces. The surprising and exceptionally good adjustment and grip characteristics of this surface texture is preferred for wedge unit 54 and base pad 50. The reader will observe that the attitude control wedge 54 may be selectively interspaced under any of the edges of the base pad 50 and thus adjust the camera attitude from three or more contact points with respect to the base pad or the basic underlying surface. A preferred embodiment of the attitude control wedge member 54 is the twin wedge that is illustrated in FIG. 1. However other embodiments such as one or more single wedge members with a surface texture described herein are considered to be within the scope of this invention for an ultra lightweight freestanding control of attitude or elevation adjustment of a camera accommodating a wide range of lens assemblies.

FIG. 2 shows the base device 10 with the camera 104 accommodating a long lens assembly 106 mounted thereon and stabilized in aim and shoot attitude. The eyes at the rear of the base device receive the fastener ends of accessory crossed shoulder straps and thus form triangular configurations in several planes to enhance stabilization. The photographer's hand grasping the base device 10 under the center of gravity of the camera lens assembly and applying gentle forward thrust as his elbow is held against his torso contributes substantially to components of triangular configurations both in the vertical and in horizontal planes. Elevation of the hand and head with respect to the shoulders enables selective tensioning of the straps as they converge at the eyes 30, 30 and coming from over the shoulder and from under the arm pits and thus permit quick stabilized aiming upon and tracking of a photo objective.

FIG. 3 shows a comfortable lens down, hands free carry configuration whereby the base device 10 and camera 104 are stabilized by the combination of the following:

1. Accessory snap fastener ends on the crossed at the back shoulder straps that angle downward and inward at the front of the photographer's torso engage the eyes 30, 30 situated close to the base device 10,
2. the long lens assembly 106 hanging in a predominately downward attitude due to the force of gravity;
3. the surface texture of the base surface 52 composed of a multitude of portions of cell walls 101 (shown magnified in FIG. 8) assists in resisting sideways swings as the weight of the camera 104 and long lens 106 keep the base pad surface 52 in contact with the photographer's torso.

The reader will observe that the stabilization of the camera assembly has been greatly enhanced in hands free attitude and without the use of elastic bands, or velcro fasteners. Also observe that the camera may be comfortably carried in hands free configuration with the camera and lens controls preset and then quickly and quietly raised with the left hand to stabilized aim and shoot configuration illustrated and described under FIG. 2.

FIG. 4, FIG. 5 and FIG. 6 help illustrate the core 34 and some optional features associated with the base device 10 and are described in combination herein. FIG. 4 shows a bottom view of the base device 10 without base pad. FIG. 5 shows a sectional view taken along line 5—5 of FIG. 4. FIG. 6 shows a side sectional view taken along line 6—6 of FIG. 1. The core 34 is illustrated as a rigid member formed separately from the base shell 11. However the inventor also conceives core 34 optionally as a member that may be formed as an integral part of the body shell 11.

Features of the core member include:

core camera shelf 36 with hole 37 for screw interface 46 to camera 104 thus adds rigidity to the camera platform 12 as the interface screw 46 is tightened into the threaded socket of the camera and screw shoulder 48 bears upon the camera shelf 36 of the core 34; core rim 38 interfaces with the base pad 50 and thus provides local support thereto; optional inclined leg sockets 45 in the turret 44 accept optional telescoping leg subassemblies as a means to elevate and adjust attitude of the camera that is mounted on the base device 10. The plurality of inclined leg sockets 45 accept insertion of telescoping leg subassemblies 61 in selected positions, whereby the outward tips 66 of the legs provide a stable base to accommodate a wide variety of camera and lens assemblies.

The selected adjusted length of each leg subassembly 61 is the structure that establishes the elevation or attitude of the base device 10. FIG. 6 shows a sectional view of the basic elements, including the inner leg member 62, the outer leg tube 63, the resilient tubular coupling 64, and the press washer 65. These elements cooperate in each telescoping leg subassembly 61 to adjust leg subassembly length and maintain selected length without operation of screws, knobs or levers. The resilient characteristic of the tubular coupling 64 retains it on the end portion of the outer leg tube 63 and exerts a lesser threshold grip on the smaller outside diameter of the telescoping inner leg member. Pressure applied upon the floating pressure washer 65 in a longitudinal direction along the inner leg member 62 causes a longitudinal compression of resilient tubular coupling and reduction of the threshold grip upon the inner leg member and thus extends the position of the outer leg tube 63 in a controllable manner.

The upper ends of the inner leg members 62, 62,and 62 may be inserted into selected inclined sockets 60 in the turret wall 44 and subsequent attitude adjustment of the attitude of the camera platform may then be accomplished by adjustment of the length of the telescoping leg subassemblies. Pressure applied on the base device in a longitudinal direction along any inner leg member 62 may selectively be made to exceed the threshold grip of the resilient tubular coupling 64 upon the inner leg member 62 and thereby selectively establish the length of any selected telescoping leg subassembly 61. Thus this structure and technique of applying modest pressure enables refinement of the attitude of the camera platform while the threshold grip of each resilient tubular coupling 64 upon each respective inner leg member 62 is always sufficient to support the weight of a camera and lens assembly. Thus the resilient sleeve leg grip feature avoids inadvertent telescoping of the leg subassembly, a desirable feature in contrast to prior art lever type couplers.

FIG. 6 also shows an optional feature for limiting the extended length of the telescoping leg subassembly comprising a fixed length fexible strand 67 within the outer leg tube 63 and anchored at the outer end thereof by leg tip 66. The other end of the fixed length flexible strand is anchored to the inner leg member by bond material 68. The strand 67 thus retains a portion of the inner leg member 62 telescoped within the outer leg tube 63 to assure structural integrity.

The inventor conceives the leg tip grip 66 shown in FIG. 1 and in FIG. 6 being made with the tip surface texture of a multitude of portions of cell walls as exposed by cutting action thru an EPDM blend of cellular elastomeric material 100 shown in FIG. 8 and within a specification range 5–25 psi range for compression deflection. This surface texture enables random portions of cell walls 101 contacting an underlying interface material 120 to flex and engage a wide range of smooth or irregular surfaces on that interface and in a wide range of interface attitudes.

FIG. 6 also shows an optional thumb screw 70 with shoulder 71 and resilient pad 72 for applying a grip action upon the leg members 62, 62 as the leg members reside in their selected leg sockets 60.

FIG. 7 shows the core 34 with a protruding turret 44 and firm base interface 40 for tripod and threaded socket 42 to accept a tripod head interface screw 114 from an accessory tripod head 112 and thus secure a firm interface as the interface screw 114 is tightened to bring the firm surfaces together.

FIG. 7 also illustrates how a flexible protective cover as an accessory may interface with the camera and the base device 10 and with its cover grip troughs 22, 22, as described earlier in the FIG. 1 portion of this specification FIG. 8 illustrates magnification of a sample surface texture of a multitude of portions of cell walls 101 and of cavities 102 in random orientation as exposed by cutting action thru cellular elastomeric material 100. The multitude of portions of resilient cell walls is the preferred embodiment of surface texture for the base surface 55 of attitude control wedge 54, for the tip of leg tip 66 and for the base surface 52 of base pad 50, whereby random portions of cell wall flex and grip any of a wide variety of smooth or irregular underlying base surfaces 120 in wide variety of angular orientations.

Furthermore smooth rotational support for safari type tracking of a photo objective (with long lens extended over a window ledge) is immediately provided by the structure of the base surface 52 of the base pad 50. The base device 10 is easily moved longitudinally to position the lens center of gravity with respect to the window ledge. Random portions of the multitude of cell walls of the base surface 52 now flex and reposition in a viscous-like damping effect with respect to the angular movement of the camera base upon the lateral window ledge.

FIG. 9 shows an optional embodiment of a firm core member 134 comprising a formed offset core element 138 with camera shelf 36 containing a hole 37 (to accept camera interface screw 46 shown in FIG. 6),a turret 144 with base interface for tripod 40, and insert threaded socket 142 to secure these elements together as another option to the structure of core 34. Cord notches 25, 25 are shown in core element 238 as an option for securing cord ends 18, 18 illustrated in FIG. 4. The offset core element 138 combines with the turret 144 to establish a base interface 40 (for tripod) that does not protrude below the base surface 52 fo base pad 50. This feature, like that of core 34, enables the base surface 52 of the base pad 50 to function in freestanding configurations either with or without attitude control wedge 54 and also structures the firm base interface 40 to firmly seat upon an optional accessory tripod head 112 as its tripod interface screw 114 is secured into the threaded socket 142.

FIG. 10 shows an optional embodiment of eyes 30, 30 as an integral part of base device 10 shown in partial bottom view.

The reader may observe that the features of the base device 10 enable the accessory flexible protective cover 108 to cover the lens assembly 106 and the camera 104 in any of the configurations described in relation to FIG. 1 thru FIG. 10 and be quickly retained by twisting and pulling the corners 109, 109 under the camera body 104 and into the troughs 22, 22 of the camera platform 12. This structure configuration enables the outer surface of the flexible cover to direct any precipitation away from the envelope of the camera and and also to enabe quick removal of the cover by reverse in the direction of pull.

The reader may also observe the features of this versatile base device 10 enables an accessory tripod device 112 to be carried by the threaded tripod interface screw socket 42. The weight of the full assembly including camera and lens assembly are transfered and distributed to both of the photographer's shoulders via the ends of the accessory shoulder straps as they engage the eyes 30, 30 of the base device 10.

The reader may now refer to FIG. 2 again to boserve that a tripod in vertical attitude with respect to the threaded screw socket in the base device 10 would add another stabilizing component to this configuration and thus enhance the stability of the camera base device 10 for tracking a photo objective.

While the above description contains many specifications, the reader should not consider these as limitations of the scope of the invention, but merely exemplifications of preferred embodiments thereof. Those skilled in the art will envision many other possible variations are within its scope. For example, skilled artisans will readily be able to change dimensions and shapes of the various embodiments. They will be able to make the structures of alternative materials varying in density and resiliency. Alternative materials could include theremoformed or molded plastics. The surface texture of the interface surfaces could be molded or resilient material to form portions of cell walls. Accordingly the reader is requested to determine the scope of the invention by the appended claims and their legal equivalents, and not by the examples which have been given.

I claim:

1. A lightweight base device for stabilization and protection of a camera or the like in freestanding, transporting or hand held configuration, comprising;
    a structural shell body member comprising a camera platform having a hole for a camera interface screw for secure mounting to a camera, ribs at each side of a depressed trough extending forward and downward from the said camera body platform, and supporting shell walls extending downward from said platform and said ribs to a base rim.

2. A base device according to claim 1 and additionally wherein the attitude of the said camera platform is inclined with respect to the said base rim.

3. A base device according to claim 1 and additionally wherein the rear corner areas of the camera platform include depressed trough to accept and retain the corners of a flexible protective over the camera cover as said cover corners are pulled beneath the camera body and into the said depressed trough areas, whereby the said flexible cover is retained.

4. A base device according to claim 1 and additionally wherein the said base device comprises;
    eyes attached to said base device to accept accessory straps as an optional means of support,
    base pad with a textured base surface attached to said base rim of the base device whereby traction is enhanced with respect to an interfacing surface, such as the photographer's body or a sloping underlying support surface.

5. A base device according to claim 1 and additionally wherein one or more control wedge(s) with a textured base surface of a multitude of resilient portions of cell walls are selectively interspaced beneath one or more edges of the said base device and a basic underlying surface as a means to adjust the attitude or elevation of the said base device.

6. A base device according to claim 1 and additionally wherein one or more control wedge(s) of twin wedge form and with a surface texture of a multitude of portions of cell walls as exposed by cutting action thru cellular elastomeric material is interspaced beneath one or more edges of the base device and upon an underlying interface material as a means to adjust the attitude or elevation of the said base device.

7. A base device according to claim 1 and additionally wherein the elevation or attitude is adjusted by selectively interspacing one or more control wedge(s) beneath one or more edges of said base device and upon an underlying interface surface and the wedge member comprising;
   surface texture of a multitude of portions of cell walls and of cavities formed by cell walls in random orientation as exposed by cutting action thru cellular elastomeric EPDM blend material within a 5–24 psi range of compression deflection, whereby random portions of cell walls contacting an interface surface material flex and engage that material in a wide range of angular or inclined orientations.

8. A base device according to claim 4 and additionally wherein the base surface of the said resilient base pad is of a texture like a multitude of portions of cell walls and cavities formed by cell walls in random orientation as exposed by cutting action thru resilient elastomeric material, whereby portions of said cell walls flex and engage and grip a wide range of surface textures on an interfacing surface and in a wide range of angular or inclined orientations.

9. A base device according to claim 4 and additionally wherein the said pad texture comprises a multitude of portions of cell walls and cavities in random orientation as exposed by cutting action thru cellular elastomeric material of EPDM blend within a 5–24 psi range for compression deflection, whereby the random portions of cell walls contacting an interface material may flex and engage said interface material in a wide range of angular or inclined orientations.

10. A base device according to claim 4 and additionally wherein a rigid core member is substantially within the envelope of the said base shell with the said resilient base pad member additionally having a hole to accept intrusion of the turret and with the said core member comprising;
    a camera platform shelf with thru hole therein to accept the said camera interface screw and thus reinforce and clamp the said camera platform of the said shell body to the camera,
    a protruding turret and base interface for tripod that do not protrude below the said resilient base pad, as as means to enable stable repose when said base device is in freestanding configuration upon its base pad;
    a threaded socket in the said base interface for tripod, to accept an interface screw from an accessory tripod head as a means to secure a firm interface of the said base interface with respect to the accessory tripod head.

11. A base device according to claim 10 and additionally wherein the said turret includes a plurality of inclined leg sockets for accepting a plurality of leg members for adjustment of elevation or attitude of said camera platform.

12. A base device according to claim 11 and additionally wherein one or more telescoping leg subassembly(s) are selectively inserted into one or more of the said inclined leg sockets as a means to adjust elevation or attitude of the said camera platform and wherein one or more of the said leg subassembly(s) comprises;
    an inner leg member for insertion into said inclined leg socket,
    an outer leg tube slidably surrounding a portion of the said inner leg member,
    a resilient tubular residing on an end portion of the said outer leg tube and slidably encompassing a portion of the said inner leg member with the said resilient tubular coupling exerting a lesser threshold grip on the said inner leg member than that exerted on the said outer leg tube,
    a floating pressure washer on the said inner leg member to apply a longitudinal pressure to compress the resilient tubular coupling and thereby reduce the threshold grip on the said inner leg member as a means to selectively and controllably extend the position of the said outer leg tube,
    the said inner leg member to apply longitudinal pressure along the said inner leg member and thus linearly compress the portion of the resilient tubuler coupling that is exerting threshold grip on the said inner leg member, and thus selectively and controllably shorten the length of the said telescoping leg subassembly, as inner leg member slides to a selected position within the said outer leg tube,
    the combination of the selection of the said inclined leg sockets and the controlled length of each of the said telescoping leg subassemblies thus comprise the structure to produce a selected elevation and attitude of the said camera platform of the said device in a stable freestanding configuration and thus accommodate a wide range of camera and lens assemblies.

13. A base device according to claim 12 and additionally wherein the said telescoping leg subassembly comprises;
    said outer leg with fixed length of flexible strand added therein and one end anchored at the base end and the other end anchored to the said inner leg member as a means to limit the maximum extended length of the said subassembly and thereby preclude accidental separation thereof.

14. A base device according to claim 12 and additionally wherein the said telescoping leg subasembly comprises;
    said leg assembly with a generally cylindrical resilient tip with base surface texture resembling the texture of a multitude of portions of cell walls and of cavities in random orientation as exposed by cutting action thru resilient cellular elastomeric material, as a means to grip smooth, or irregular, or sloping interfaces.

15. A lightweight base device for stabilization and protection of a camera or the like in freestanding or transporting, or hand held configuration, comprising;
    a base shell comprising a camera platform having a hole for a camera interface screw to secure to a camera body, ribs at each side of a depressed trough extending forward and downward from the said camera platform, and supporting shell walls extending downward from said platform and ribs to a base rim, the rear corner areas of said camera platform include depressed trough areas to accept and retain the corners of a flexible over the camera cover as said cover corners are pulled beneath the camera body and into the said depressed trough areas, whereby the said flexible cover is retained, eyes as an integral part of said base shell, for accepting optional accessory strap(s) and thus when in tension impart stabilizing force components to the said base device.

16. A base device according to claim 15 and additionally wherein the said camera platform is inclined with respect to the said base rim.

17. A base device according to claim 15 and additionally wherein the said base device comprises;
a resilient base pad with a surface texture of a multitude of portions of cells walls as exposed by cutting action thru cellular elastomeric material of EPDM blend within the range for 5–24 psi compression deflection, whereby portions of cell walls flex and grip or provide traction with respect to an interfacing surface.

18. A lightweight base device for stabilization or protection of a camera or the like in freestanding, or transporting or hand held usage, comprising;
a base shell of rigid material comprising a camera platform having a hole to accept a camera interface screw to secure to a camera body, an under the lens trough and ribs at sides thereof extending forward and downward from said camera platform, and shell walls extending downward from said camera platform and said ribs to a base rim,
depressed trough areas near the rear corner areas of said camera platform, to accept and retain the corners of a accessory flexible over the camera cover as corners of the cover are pulled beneath the camera body and into the said depressed trough areas, whereby said cover is releasably retained,
a resilient base pad attached to said rim of said base and including a hole to accept intrusion of a base interface for a tripod,
a rigid core as an integral part of said base shell and substantially within the said base shell and said base pad with the said core comprising;
a turret and base interface for tripod intruding into the said hole in the said base pad and residing within the thickness of said base pad,
a theaded socket in said base interface for tripod to accept the interface screw of an optional accessory tripod head and thus secure a firm interface therewith, as an optional means to stabilize or support the said base device.

19. A base device according to claim 18 and additionally wherein the said turret includes a plurality of inclined sockets to accept a selective insertional of optional accessory leg subassemblies to support, or to elevate, or to adjust the attitude of the said base device.

20. A base device according to claim 18 and additionally wherein eyes are an integral part of the said base device, for accepting optional accessory strap(s) and thereby when placed in tension add components of force to stabilize base device with respect to the photographers torso.

* * * * *